United States Patent [19]

Matsumura

[11] Patent Number: 4,651,269
[45] Date of Patent: Mar. 17, 1987

[54] CURRENT FLOW REVERSING CIRCUIT
[75] Inventor: Ken Matsumura, Odawara, Japan
[73] Assignee: Kabushiki Kaisha Toshiba, Japan
[21] Appl. No.: 729,662
[22] Filed: May 2, 1985
[30] Foreign Application Priority Data May 10, 1984 [JP]  Japan ................................ 59-93181
Dec. 28, 1984 [JP]  Japan ................................ 59-276129

[51] Int. Cl.$^4$ ............................................. H02M 7/02
[52] U.S. Cl. ..................................... 363/63; 363/56;
363/132; 318/599
[58] Field of Search ................... 363/56, 63, 98, 132;
318/599

[56] References Cited
U.S. PATENT DOCUMENTS 3,579,080  5/1971  Vollrath ................................ 363/63
4,409,527  10/1983  Sommeria ........................ 363/63 X

FOREIGN PATENT DOCUMENTS

2558571   7/1977  Fed. Rep. of Germany .
0160370  10/1982  Japan ................................. 363/132
58-154378  9/1983  Japan .
504134    2/1971  Switzerland .
2093287   8/1982  United Kingdom .
0729780   4/1980  U.S.S.R. ............................... 363/63

Primary Examiner—Patrick R. Salce
Assistant Examiner—Marc S. Hoff
Attorney, Agent, or Firm—Finnegan, Henderson, Farabow, Garrett & Dunner

[57] ABSTRACT

There is disclosed a circuit for reversing an electric current flow comprising a motor, a circuit formed of a first transistor at a power source $V_{CC}$ side and a third transistor at the ground side which are connected in series, a circuit formed of a second transistor at the power source $V_{CC}$ side and a fourth transistor at the ground side which are connected in series, the junction of the first and third transistors being connected to one terminal of the motor and the junction of the second and fourth transistors being connected to the other terminal of the motor, and a pulse generator for producing an output signal which delays the turn-on timing of the third or fourth transistor until the state of the first or second transistor has been changed from an on-state to an off-state.

5 Claims, 38 Drawing Figures

CURRENT FLOW REVERSING CIRCUIT

BACKGROUND OF THE INVENTION

The present invention relates to a current flow reversing circuit, and more particularly, to a current flow reversing circuit for reversing the flow of current to a motor.

Figure 1:
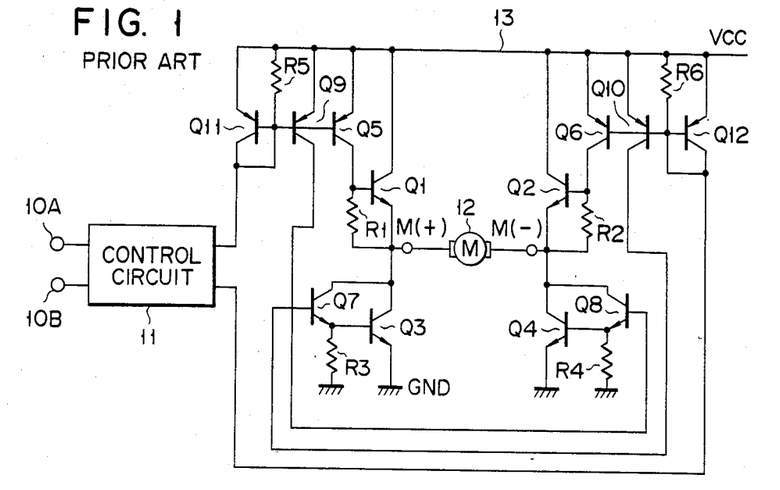
FIG. 1 is a diagram of a prior circuit for reversing the flow of electric current fed to a DC motor.

A typical example of the circuit for reversing the flow of current flowing into a DC motor is shown in FIG. 1. As shown, an output signal from a control circuit acting as a logical circuit is used for setting up a stop mode, a forward mode and a reverse mode of a motor 12. Relationships among logic levels of control signals applied to the terminals M(+) and M(−) of motor 12 and the input terminals 10A and 10B of a control circuit 11, and the respective modes are tabulated as below.

| 10A | 10B | M(+) | M(−) | Mode |
|-----|-----|------|------|------|
| H | L | H | L | Forward |
| H | H | L | H | Reverse |
| L | H/L | High impedance | | Stop |

In the above table, H denotes a high level and L denotes a low level. In a forward mode, the output signal of the control circuit 11 turns on a transistor Q11, and also transistors Q9 and Q5. These transistors Q11, Q9 and Q5 form a current mirror circuit. Upon turning on transistor Q5, a transistor Q1 is appropriately biased to turn on. When transistor Q9 is turned on, transistors Q8 and Q4, which are connected in a Darlington fashion, are appropriately biased and turned on. Then, current flows from the terminal M(+) to the terminal M(−) of motor 12, motor 12 is rotated in the forward direction. For turning the motor in the reverse direction, the output signal of control circuit 11 turns on transistors Q12, Q10 and Q6. Subsequently, transistor Q2 is appropriately biased by transistor Q6. Transistors Q7 and Q3 are also biased by transistor Q10 and turned on. Consequently, the current flows from the terminal M(−) to the terminal M(+), and motor 12 rotates in the reverse direction. For stopping the motor, transistors Q11 and Q12 are both turned off. Accordingly, transistors Q1 to Q4 are not biased and no current is fed to motor 12, thereby to stop motor 12.

In the above circuit, resistors R1 to R6 are provided for preventing an erroneous operation of the circuit due to leak current, and for reducing the off-time of the switching operation of the transistor, viz. reducing the carrier storage effect. The off-time means a time interval between an on-state of the transistor and an off-state.

The terminal currents $I_{OLf}$ and $I_{OLr}$ of motor 12 in the forward and the reverse modes are mathematically expressed by $$I_{OLf} = \frac{V_{CC} - \{V_{BEQ1} + V_{CE(sat)Q5} + V_{BEQ4} + V_{CE(sat)Q8}\}}{R_L} \quad (1)$$

$$I_{OLr} = \frac{V_{CC} - \{V_{BEQ2} + V_{CE(sat)Q6} + V_{BEQ3} + V_{CE(sat)Q7}\}}{R_L} \quad (2)$$

where
$R_L$: Resistance of the motor.
$V_{CC}$: Voltage on power line 13.
$V_{BEQ1}$: Voltage across the base-emitter path of transistor Q1.
$V_{CE(sat)Q5}$: Voltage across the collector-emitter path of transistor Q5.
$V_{BEQ4}$: Voltage across the base-emitter path of transistor Q4.
$V_{CE(sat)}$: Voltage across of the collector-emitter path of saturated transistor Q8.

In order to increase the currents $I_{OLf}$ and $I_{OLr}$ to the amplitude level needed to drive motor 12, a sufficient base current is fed to each transistor Q1 to Q4.

In the above circuit, when motor 12 is steady in the forward or the reverse mode, the current as given by the equation (1) or (2), flows through motor 12. However, if the time period taken for transistor Q1 or Q2 to change its state from the on-state to the off-state, viz. the off-time, is long, a surge current flows through a series circuit comprising transistors Q1 and Q3 or that of transistors Q2 and Q4.

Let us consider a case where a circuit state, in which transistors Q2 and Q3 are in the on-state and transistors Q1 and Q4 are in the off-state (reverse mode), is switched to another state in which transistors Q1 and Q4 are in the on-state and transistors Q2 and Q3 are in the off-state. In this case, if the switching of the transistor to the off-state is delayed, that is, the off-time is long, a surge current flows into the series circuit of transistors Q2 and Q4. This electric current frequently damages transistors Q2 and Q4 or their peripheral circuits.

The switching delay causing the surge current is due to the carrier storage effect of the element when its state is switched from the on-state to the off-state. In the case of the transistors Q1 and Q4, the carrier storage effect changes dependent on the operating current ICQ5 and ICQ9 flowing through transistors Q5 and Q9, which bias transistors Q1 and Q4. The operating current ICQ5 and ICQ9 are given by $$I_{CQ5} = \frac{I_{OLf}}{h_{FEQ1}} \quad (3)$$

$$I_{CQ9} = \frac{I_{OLf}}{h_{FEQ4} \cdot h_{FEQ8}} \quad (4)$$

where $h_{FEQ1}$, $h_{FEQ4}$ and $h_{FEQ8}$ are DC current amplification factors of transistors Q1, Q4 and Q8, respectively. Since $h_{FEQ1} = h_{FEQ4}$, $$I_{CQ5}/I_{CQ9} = h_{FEQ8} \quad (5)$$

As seen from the equation (5), current flowing into transistor Q5 is hFEQ8 times the current flowing into transistor Q9. This implies that the area of transistor Q5 must be much larger than that of transistor Q9, which in turn implies that the storage effect of transistor Q1 is increased accordingly.

SUMMARY OF THE INVENTION

An object of the present invention is to provide a circuit for reversing the flow of electric current to an apparatus, such as a DC motor, which prevents surge current from flowing into the apparatus.

Figure 2:
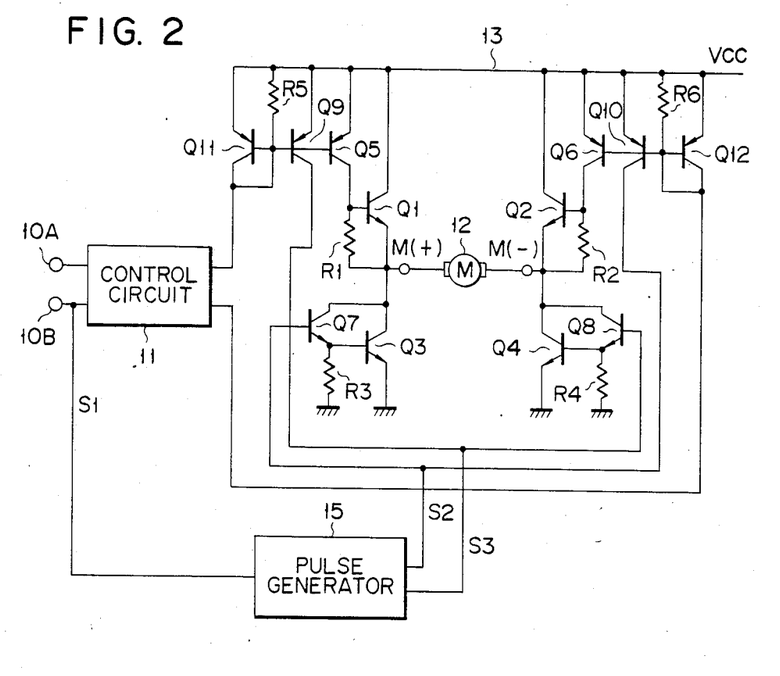
FIG. 2 is a diagram of a circuit for reversing the flow of electric current constructed according to an embodiment of the invention applied to a DC motor.

To achieve the above object, a pulse generator circuit 15 controls the off-time of transistors Q3 and Q4, as shown in FIG. 2.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the current flow reversing circuit of this invention comprises a load driven by current and having first and second terminals to which the current is pplied, first and second potential sources, first and second transistors each having collector-emitter paths respectively connected between the first potential source and said first terminal and between said first potential source and said second terminal, third and fourth transistors each having collector-emitter paths respectively connected between said first terminal and said second potential source and between said second terminal and said second potential source, said first and fourth transistors forming a first circuit for directing current flow through said load in one direction, and said second and third transistors forming a second circuit for directing current flow through said load in the opposite direction, bias means for reversing the biasing state of each of said first circuit and said second circuit thereby to cause said circuits to operate alternatively and reverse the flow of the current flowing through said load; and pulse generating means for applying first and second control pulses to, respectively, said third and fourth transistors to delay the turning-on of said third transistor until said first transistor is turned off during operation of said second circuit, and the turning-on of said fourth transistor until said second transistor is turned off during operation of said first circuit.

The accompanying drawings, which are incorporated in and constitute a part of this specification, illustrate one embodiment of the invention and, together with the description, serve to explain the principles of the invention.

DETAILED DESCRIPTION OF THE PREFERRED EMBODIMENT

Turning now to FIG. 2, there is shown a circuit for reversing the flow of current fed to a DC motor, which is an embodiment of the present invention. As shown, a pulse generator circuit 15 is additionally used in the prior circuit shown in FIG. 1. The circuit 15 contains, for example, a differential circuit and a waveshaping circuit, and receives a signal S1 from an input terminal 10B, and produces first and second output signals S2 and S3.

In FIG. 2, a control circuit 11 comprises a logic circuit for controlling the operation modes of a motor 12. Control circuit 11 has two input terminals 10A and 10B to which input signals of different logic levels, set depending on the operation mode, are applied. Logic circuit 11 also has two output terminals. The positive polarity terminal M(+) of motor 12 is connected through NPN transistor Q1 to power source line 13. Power source line 13 is connected to a power source of a high potential $V_{CC}$. The collector of transistor Q1 is connected to power source line 13. The emitter of transistor Q1 is connected to positive terminal M(+) of motor 12. The base and emitter of transistor Q1 are interconnected through a resistor R1. The positive terminal M(+) of motor 12 is also connected through NPN transistor Q3 to ground GND. The collector of transistor Q3 is connected to positive terminal M(+) of motor 12. The emitter of transistor Q3 is connected to ground GND.

The negative polarity terminal M(−) of motor 12 is connected through NPN transistor Q2 to power source line 13. The collector of transistor Q2 is connected to power source line 13. The emitter of transistor Q2 is connected to the positive terminal M(+) of motor 12. The base and emitter of transistor Q2 are interconnected through a resistor R2. The negative terminal M(−) of motor 12 is also connected through NPN transistor Q4 to ground GND. The collector of transistor Q4 is connected to the negative terminal M(−) of motor 12. The emitter of transistor Q4 is connected to ground GND.

Resistors R1 and R5, and PNP transistor Q5, Q9 and Q11 constitute a bias circuit for transistor Q1. NPN transistor Q11 constitutes a current mirror circuit together with PNP transistors Q9 and Q5. The emitters of transistors Q11, Q9 and Q5 are connected to the power source line 12. The bases of transistors Q11, Q9 and Q5 are interconnected. The bases of transistors Q11 and Q9 are connected to power source line 13 through a resistor R5. The collector of transistor Q11 is connected to one of the output terminals of control circuit 11. The base and collector of transistor Q11 are interconnected. The collector of transistor Q9 is connected to the base of transistor Q8. The collector of transistor Q5 is connected to the base of transistor Q1.

Resistors R2 and R6, and PNP transistors Q6, Q10 and Q12 constitute a bias circuit for transistor Q2. PNP transistor Q12 constitutes a current mirror circuit together with PNP transistors Q10 and Q6. The emitters of transistors Q12, Q10 and Q6 are connected to power source line 13. The bases of transistors Q12, Q10 and Q6 are interconnected. The bases of transistors Q12 and Q10 are connected to power source line 13 through a resistor R6. The collector of transistor Q12 is connected to the other output terminal of control circuit 11. The base and collector of transistor Q12 are interconnected. The collector of transistor Q10 is connected to the base of transistor Q7. The collector of transistor Q6 is connected to the base of transistor Q2.

An NPN transistor Q7 constitutes a bias element for transistor Q3. The collector-emitter path of transistor Q7 is connected across the collector and base of transistor Q3. The collector of transistor Q7 is connected to the collector of transistor Q3. The transistor Q7 is also connected to ground GND through a resistor R3. The base of transistor Q7 is connected to the collector of transistor Q10.

An NPN transistor Q8 constitutes a bias element for transistor Q4. The collector-emitter path of transistor Q8 is connected across the collector and base of transistor Q4. The collector of transistor Q8 is connected to the collector of transistor Q4. The emitter of transistor Q8 is connected to the base of transistor Q4. The emitter of transistor Q8 is also connected to ground GND through a resistor R4. The base of transistor Q8 is connected to the collector of transistor Q9.

Pulse generator 15 has an input terminal and two output terminals. The input terminal of pulse generator 15 is connected to the input terminal 10B of control circuit 11. One of the output terminals of pulse generator 15, at which an output signal S2 appears, is connected to the base of transistor Q7 and the collector of transistor Q10. The other output terminal of pulse generator 15, at which an output signal S3 appears, is connected to the base of transistor Q8 and the collector of transistor Q9.

According to the FIG. 2 embodiment, one of the stop, forward and reverse modes can be set according to the output signal from the control circuit 11. The relationships among the logic levels at the terminals M(+) and M(−) of motor 12, logic levels of the control signals applied to the input terminals 10A and 10B of the control circuit 11, and the respective modes are tabulated as below.

| 10A | 10B | M(+) | M(−) | Mode |
|---|---|---|---|---|
| H | L | H | L | Forward |
| H | H | L | H | Reverse |
| L | H/L | High impedance | | Stop |

In the above table, H indicates a high level, and L, a low level.

Figure 3A:
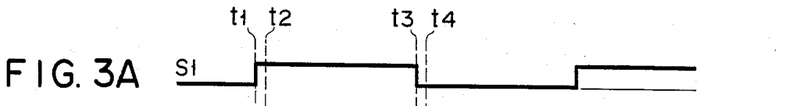
FIGS. 3A through 3G show time charts of signals at various portions in the circuit of FIG. 2.
Figure 3B:
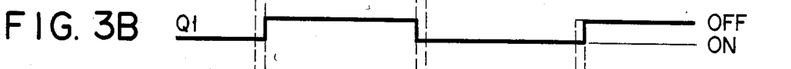
Figure 3C:
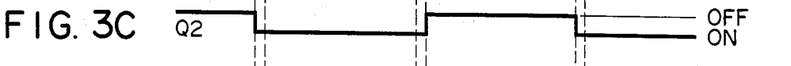
Figure 3D:
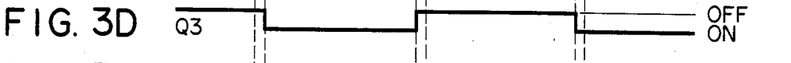
Figure 3E:
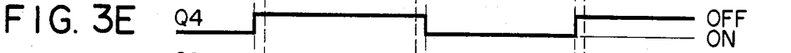
Figures 3F, 3G:
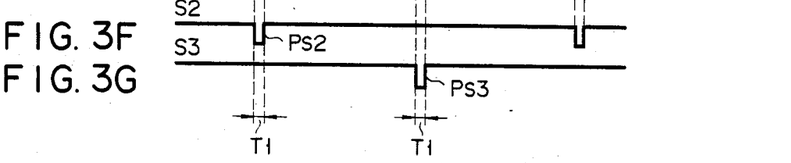

FIGS. 3A through 3G show a set of waveforms useful in explaining the operation mode of each transistor in the circuit of FIG. 2. FIG. 3A shows a waveform of a signal S1 at the input terminal 10B. FIGS. 3B through 3E show waveforms of the collector voltages of the transistors Q1–Q4. In the figures, the high level indicates an off state, and the low level, an on state. FIGS. 3F and 3G show waveforms of the output signals from pulse generator 15.

In the forward mode, viz. when motor 12 forwardly rotates, the output signal from control circuit 11 causes transistor Q11 to turn on. At this time, transistors Q9 and Q5 constituting a current mirror circuit are also turned on. Upon turning on transistor Q5, transistor Q1 is appropriately biased to be turned on. When transistor Q9 is turned on, transistors Q8 and Q4 connected in a Darlington fashion are appropriately biased to turn on. As a result, current flows from the terminals M(+) to M(−) of motor 12, and motor 12 is rotated forwardly. In the reverse mode, the output signal from control circuit 11 causes transistors Q12, Q10 and Q6 to be turned on. Transistor Q2 is appropriately biased through transistor Q6, and also transistors Q7 and Q3 are biased through transistor Q10. Then, current flows from the terminals M(−) to M(+), and motor 12 is rotated reversely. In the stop mode, both the transistors Q11 and Q12 are turned off. Therefore, no bias potential is applied to transistors Q1 through transistor Q4, and no drive current is fed to motor 12. As a result motor 12 is stopped.

In the circuit as mentioned above, resistors R1 to R6 are provided for preventing an erroneous operation of the circuit due to a leak current, and reduction of an off-time in the switching operation of the transistor, that is, reduction of the carrier storage effect.

The terminal currents $I_{OLf}$ and $I_{OLr}$ of the motor in the forward mode and reverse mode are respectively given $$I_{OLf} = \frac{V_{CC} - \{V_{BEQ1} + V_{CE(sat)Q5} + V_{BEQ4} + V_{CE(sat)Q8}\}}{R_L} \quad (1)$$

$$I_{OLr} = \frac{V_{CC} - \{V_{BEQ2} + V_{CE(sat)Q6} + V_{BEQ3} + V_{CE(sat)Q7}\}}{R_L} \quad (2)$$

where $R_L$: Resistance of motor 12.

$V_{CC}$: Voltage on power source line 13.

$V_{BEQ1}$: Voltage across the base-emitter path of transistor Q1.

$V_{CE(sat)}$: Voltage across the collector-emitter of saturated transistor Q5.

$V_{BEQ4}$: Voltage across the base-emitter path of transistor Q4.

$V_{CE(sat)Q8}$: Voltage across the collector-emitter of saturated transistor Q8.

In order for the currents $I_{OLf}$ and $I_{OLr}$, as given by the equations (1) and (2) respectively, to drive motor 12, sufficient currents are fed to the bases of transistors Q1 to Q4.

With reference to FIG. 3, time t1, the state of transistors Q1 and Q4 is reversed from an on-state to an off-state, and the state of transistors Q2 and Q3 is reversed from the off-state to the on-state. Such a reverse of the transistors results from the control of transistors Q5, Q9, Q11, Q6, Q10 and Q12 by control circuit 11.

Transistor Q1 requires a period T1 of time from time t1 until it is completely turned off (t2). This is due to the carrier storage effect of the transistor per se. During the period T1, transistors Q1 and Q3 are concurrently turned on in the case of the FIG. 1 circuit of the prior art. In the FIG. 2 circuit of the present embodiment, the output signal S2 from the pulse generator 15, as shown in FIG. 3F, is applied to the base of transistor Q7. The output signal S2 contains a pulse PS2 to delay the turning on of transistor Q3, which otherwise is turned on at time t1, until time t2, that is to say, to delay the turning on operation by the period T1. Upon receipt of the pulse PS2, transistor Q3 is not turned on until transistor Q1 is sufficiently in an off-state (at time t2); Therefore, transistors Q1 and Q3 are prevented from being concurrently turned on. This implies that no surge-current flows through the series circuit of transistors Q1 and Q3.

This control holds true when the state of transistors Q2 and Q3 are reversed from the on-state to the off-state, and the state of transistors Q1 and Q4 are reversed from the off-state to the on-state. Transistor Q2 takes period T1 from time t3 until it is completely in the off-time (at time t4), due to the carrier storage effect of transistor Q2. During this period T1, in the prior circuit of FIG. 1, transistors Q2 and Q4 are concurrently turned on. On the other hand, in the present embodiment shown in FIG. 2, pulse generator 15 applies an output signal S3 as shown in FIG. 3G to the base of transistor Q8. The output signal S3 contains pulse PS3 to delay the turning on of transistor Q4, which otherwise turns on at time t3, until time t4, that is, to delay it by period T1. Thus, transistor Q3, upon receipt of the pulse PS3, is not turned on until transistor Q3 is sufficiently in the off-state (at time t4). Therefore, transistors Q2 and Q4 are never turned on concurrently. Further, no surge current flows into the series circuit of transistors Q3 and Q4.

Figure 4:
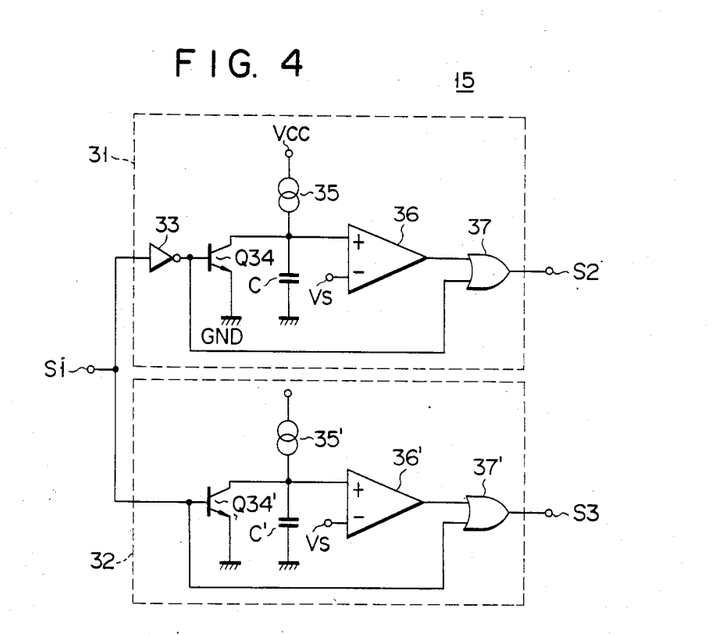
FIG. 4 shows a schematic diagram of the pulse generator of the current flow reversing circuit of FIG. 2.

FIG. 4 is a schematic circuit diagram showing an arrangement of the pulse generator 15 in the current flow reversing circuit shown in FIG. 2. In the pulse generator shown in FIG. 4, reference numeral 31 generally designates as a first pulse generating circuit which receives an input signal S1 and produces a first signal S2. A second generating circuit S2 receives the same input signal S1 and produces a second signal S3. In the first pulse generating circuit 31, reference numeral 33 designates an inverter which reverses the phase of the input signal S1. An NPN transistor Q34, serving as an input switch, is connected at the base to the output signal from the above inverter 33 and grounded at the emitter, and connected at the collector through a constant current source 35 (or a resistor) to the power source $V_{CC}$. C is a capacitor connected between the collector of the transistor Q34 and ground. Numeral 36 stands for a voltage comparator which is connected at the noninverting (+) input terminal to the collector of the transistor Q34 and at the inverting input terminal (−) to a reference voltage Vs (a predetermined voltage between the power voltage $V_{CC}$ and the ground potential). An OR circuit 37 ORs the outputs of the comparator 36 and the inverter 33, to produce a signal S2. The second pulse generating circuit 32 is different from the first pulse generating circuit 31 only in the following points: The inverter 33 is omitted, the input signal S1 is directly led to the transistor Q34 as the input switch and to the OR circuit 37, not through the inverter. Therefore, in the second pulse generator, primed reference numerals are used for designating like portions in the first pulse generator.

Figure 5:
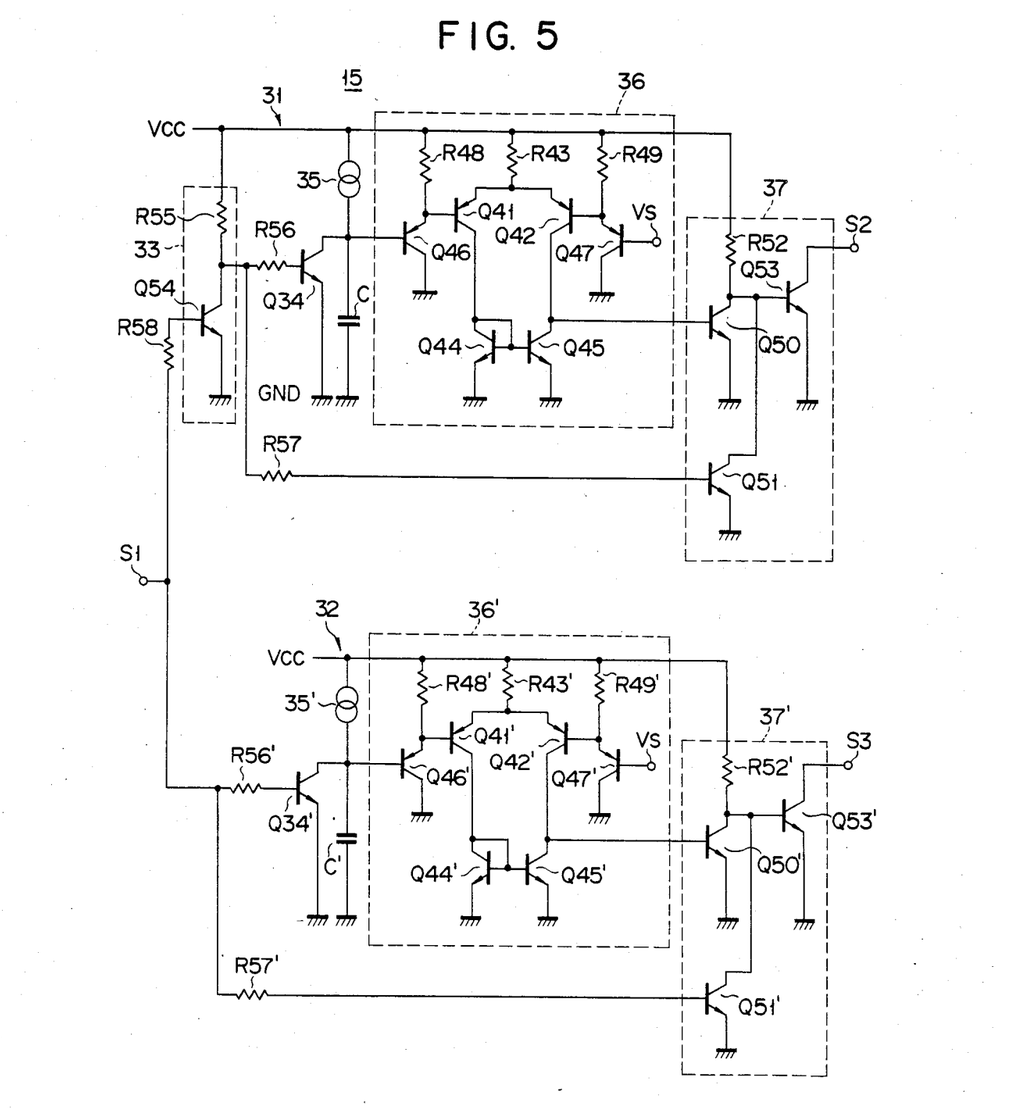
FIG. 5 is a circuit diagram of the pulse generator of FIG. 4.

FIG. 5 shows a detailed schematic diagram of the pulse generator shown in FIG. 4. In the pulse generating circuit 31 in FIG. 4, the voltage comparator 36 includes PNP transistors Q41 and Q42 for differential operation, which are connected together at the emitters, a resistor R43 connected between the emitter interconnection point and the power source $V_{CC}$, NPN transistors Q44 and Q45 which are connected in a current mirror fashion and respectively serve as loads of the transistors Q41 and Q42, drive transistors Q46 and Q47 for driving the bases of the differential transistors Q41 and Q42, and resistors R48 and R49 respectively serving as the loads of the drive transistors Q46 and Q47. The OR circuit 37 includes two NPN transistor Q50 and Q51 which are respectively connected at the bases to two output signals (a collector voltage of a transistor Q45 and a base voltage of a transistor Q34), and grounded at the emitters, and interconnected at the collector, a load resistor R52 which is connected between the above collector interconnecting point and the power source $V_{CC}$, an NPN transistor Q53 of which the collector serves as an output terminal for the signal S2, and which is connected at the base to the collector interconnecting point, and grounded at the emitter The inverter 33 includes an NPN transistor Q54 which is connected at the base to the input signal S1, and grounded at the emitter, and connected at the collector to the power source $V_{CC}$ through a load resistor R55. The bases of the transistor Q34 and Q51 are connected to current restricting resistors R56 and R57, respectively. The resistors R43, R48, R49, R52 and R55 may be substituted by constant current source circuits, respectively. In FIG. 4, the circuit arrangement of the pulse generating circuit 32 is the same as that of the pulse generating circuit 31.

Figure 6A:
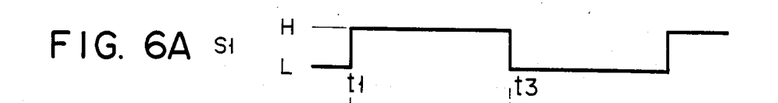
FIGS. 6A–6G show timing charts illustrating the operation of the pulse generator of FIG. 4.
Figure 6B:
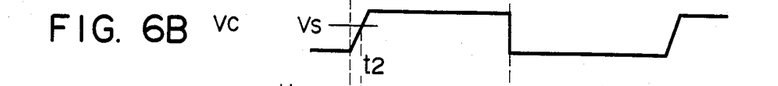
Figure 6C:
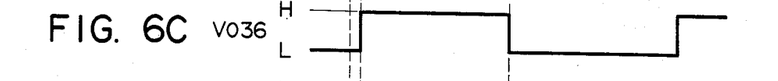
Figures 6D, 6E:
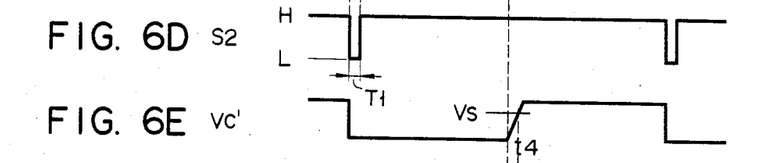
Figure 6F:
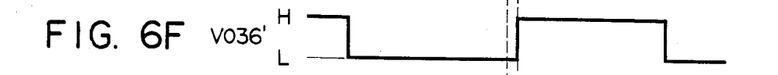

The operation of the pulse generator 15 of the FIG. 4 will be described, referring to time charts shown in FIGS. 6A to 6G. When the input signal S1 (FIG. 6A) is L in level (in this case, a forward mode is set up), in the first pulse generating circuit 31, the output from the inverter 33 is H in level, and the transistor Q34 is in an on-state. Therefore, the input voltage (the voltage across the capacitor C) to the comparator 36 is at ground potential (FIG. 6B). The output voltage Vo36 of the comparator is L (FIG. 6C). This L level signal and the output signal of the inverter 33 are applied to the inputs of the OR circuit 37, respectively. The OR circuit 37 produces an H level signal (FIG. 6D). In the second pulse signal generator 32, the transistor Q34' is in the off-state since the input signal S1 is in L level. The input signal to the comparator 36' is higher than the reference input voltage Vs. The input signal is the voltage Vc' across the capacitor C' which is equal to the power voltage $V_{CC}$ since the capacitor is fully charged). Then, the output signal Vo36' of the comparator is in H level (FIG. 6F). The output signal S3 from the OR circuit 37' is in H level.

Under this condition, when, at time t1, the input signal S1 changes its level from L level to H level (i.e. the reverse mode is selected), the first pulse generating circuit 31 operates such that the output signal of the inverter 33 is L in level and the transistor Q34 is in an off-state. Under this condition, a constant current I35 derived from the constant current source 35 starts the charge of the capacitor C. At this time, both input signals to the OR circuit 37 are L, so that the output signal S2 is inverted in level to be L. After a fixed period of time T1 (time t2), the voltage Vc across the capacitor C (FIG. 6B) exceeds the reference voltage Vs, the output signal Vo36 of the comparator 36 is H, and then the output signal S2 of the OR circuit 37 is returned to be H in level. In this case, the fixed period T1 corresponds to the pulse width of the output signal (the L level duration of the output signal S2), and is given $$T1 = CVs/I \quad (1)$$

where C is capacitance of the capacitor C.

When the constant current source 35 is substituted by the resistor R, the period T1 is given $$T1 = CR \ln\left(\frac{1}{1 - \frac{Vs}{V_{CC}}}\right) \quad (2)$$

Figure 6G:
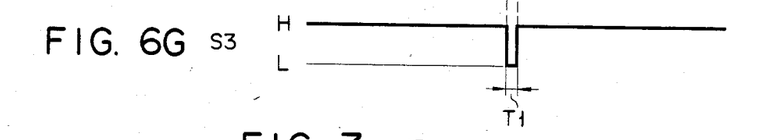

At time t1, the second pulse generator circuit 32 operates such that the transistor Q34' is in an on-state, the capacitor C' is discharged, and the output signal Vo36' of the capacitor 36' becomes L in level (FIG. 6F). At this time, one (i.e. the input signal S1) of the input signals to the OR circuit 37' is in H level. The output signal S3 remains H in level (FIG. 6G). Subsequently, when the input signal S1 is in H level or the reverse mode is selected, the output signal Vo36 of the comparator 36 of the first pulse generating circuit 31 is in H level. The output signal S3 of the OR circuit 37 is kept H in level. In the second pulse generating circuit 32, one (input signal S1) of the input signals to the OR circuit 37' is H, and the output signal S3 remains H in level.

At time t3, the input signal S1 changes its signal state from H level to L level (the forward mode is selected). In the first pulse generating circuit 31, the inverter 33 produces an H level signal, and the transistor is in an on-state. The output signal of the comparator 36 becomes L in level. At this time, one (the output signal of the inverter 33) of the input signals to the OR circuit 37 is H in level. Under this circuit condition, the output signal S2 is still in H level. On the other hand, in the second pulse generating circuit 32, the transistor Q34' is in an off-state, and charging to the capacitor C' starts. At this time, the inputs of the OR circuit 37' are both in L level. The output signal S3 becomes H in level. At time t4 after the period T1 from time t3, the output signal of the comparator 36' is level inverted to be H in level. The output signal S3 of the OR circuit 37' returns its level to H.

The pulse generator 15 produces the signals S2 and S3 shown in FIGS. 3F and 3G (FIGS. 6D and 6G) through a sequence of operations as described above referring to FIGS. 6A to 6G. Alternatively, to prevent the surge current in the current flow reversing circuit of FIG. 2, the signals S2 and S3 may be replaced by the output signals Vo36 and Vo36' of the comparators 36 and 36' in the first and second pulse generating circuits 31 and 31', respectively.

Figure 7:
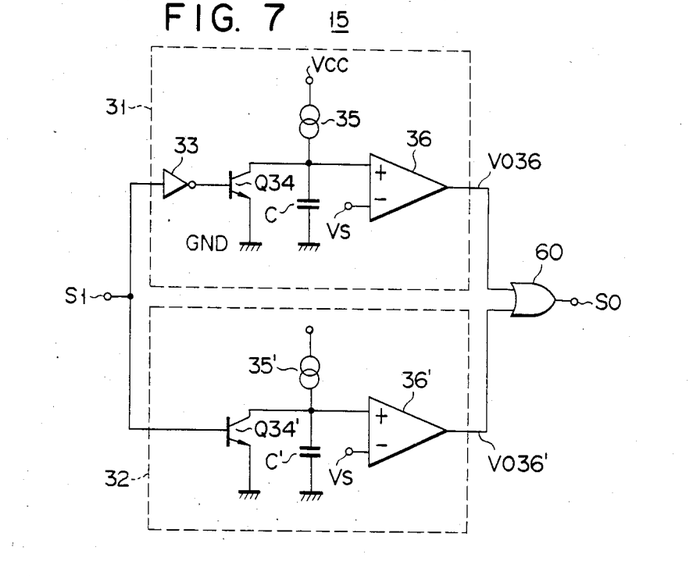
FIG. 7 shows a schematic diagram of another pulse generator.
Figure 8:
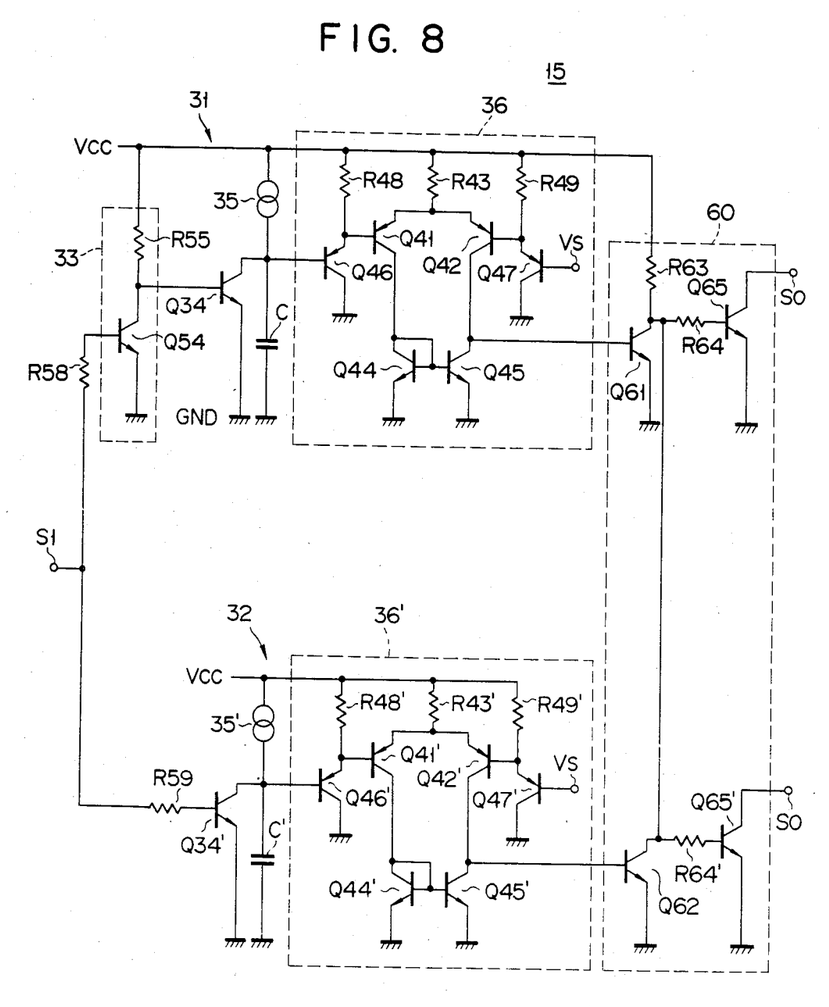
FIG. 8 shows a circuit diagram of the pulse generator of FIG. 7.
Figure 9A:
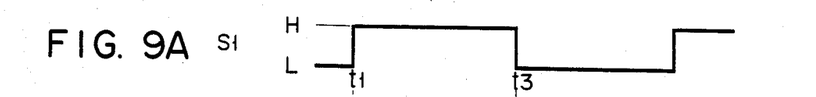
FIGS. 9A–9F show timing charts illustrating the operation of the pulse generator of FIG. 7.
Figure 9B:
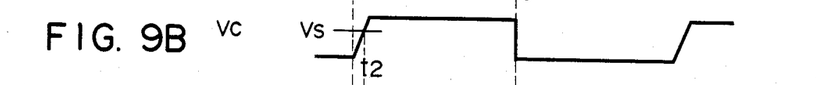
Figure 9C:
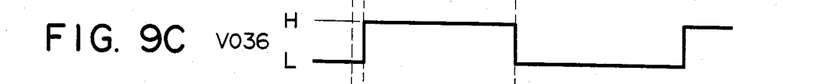
Figure 9D:
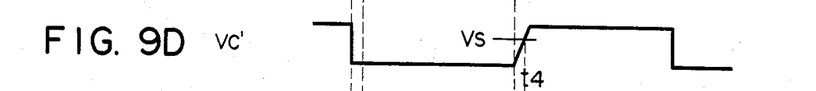
Figure 9E:
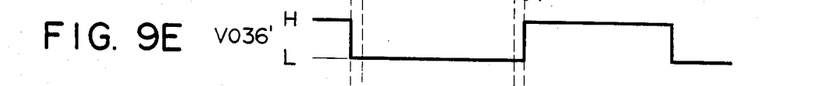
Figure 9F:
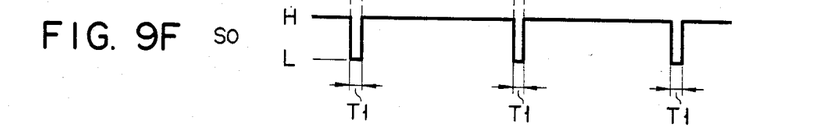

FIG. 7 shows a schematic diagram of another arrangement of the pulse generator 15. The circuit arrangement of this embodiment is the same as that of FIG. 4, except the wiring to the OR circuit. As shown, a single OR circuit ORs the output signal Vo36 of the first pulse generating circuit 31 and the output signal Vo36' of the second pulse generating circuit 32 to produce a signal So as the logical sum of the signals S2 and S3. The details of the circuit arrangement of FIG. 7 is as illustrated in FIG. 8. As shown, the OR circuit 60 is comprised of two input NPN transistors Q61 and Q62, a load resistor R63, and two output circuits for providing two paths to the ORed output signal (of the signals S2 and S3). One of the output circuits includes a resistor R64 and an output NPN transistor Q65. Similarly, the other includes a resistor R64' and an NPN output transistor Q65'. As shown, the base of the transistor Q61 is connected to the collector of the transistor Q45. The transistor Q61 is connected at the emitter to ground and at the collector to the load resistor R63 and further to one end of the resistor R64 and the collector of the transistor Q62. The base of the transistor Q65 is connected to the other end of the resistor R64. The emitter of the same is grounded. Further, the collector of this transistor serves as an output terminal for the signal So. The other output circuit has a similar connection to the above one. The pulse generator 15 thus arranged will operate according to timing charts shown in FIGS. 9A to 9F. Of the waveforms, the waveforms of FIGS. 9A to 9C correspond to those of FIGS. 6A–6C; the waveforms of FIGS. 9D and 9E, to those of FIGS. 6E and 6F; and the waveform of FIG. 9F is the composite waveform of those of FIGS. 6D and 6G.

The OR circuit of FIG. 8 has two outputs, while that of FIG. 7 has one output. The reason for this is that the OR circuit of FIG. 7 is depicted in the logic form, but that of FIG. 8 is depicted as an converter circuit.

Applying the composite signal So (FIG. 9F) of the output signals S2 and S3 to the transistors Q3 and Q4, not only delays the switching operation of the transistor Q3 from the to the off-state to the on-state, but also causes the transistor Q4 to rapidly switch from turn-on to turn-off. Therefore, even with presence of some delay in the switching operation of the transistor Q4 from the on-state to the off-state, the surge-current passing through the series route of the transistors Q2 and Q4 can be prevented. Similarly, the switching operation of the transistor Q4 from turn-off to turn-on is delayed, and the transistor Q3 is rapidly switched from the on-state to the off-state. Therefore, if there is a delay in the switching operation of the transistor Q3 from the on-state to the off-state, the surge-current passing through the route of the transistors Q1 and Q3 can be prevented.

Figure 10:
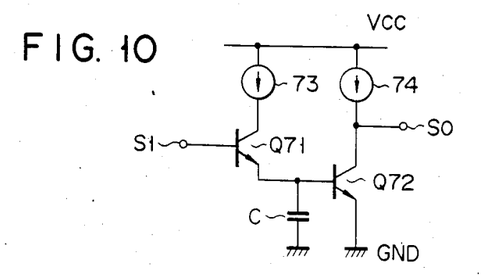
FIG. 10 shows a basic circuit diagram of another arrangement of the pulse generator.

FIG. 10 shows a basic circuit diagram of a further arrangement of the pulse generator 15.

Figure 11A:
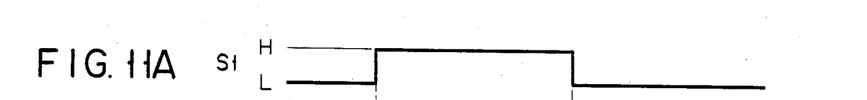
FIGS. 11A and 11B show timing charts of input and output signals of the pulse generator of FIG. 10, respectively.

An NPN transistor Q71 is an input transistor and an NPN transistor Q72 is an output transistor. The base of the input transistor Q71 is applied with the input signal S1 (FIG. 11A). The collector of the transistor Q71 is connected to the $V_{CC}$ potential $V_{CC}$ through an electric current source 73. The emitter of the transistor Q71 is connected to ground through a capacitor C. The collector of the transistor Q72 is connected to the $V_{CC}$ higher potential through an electric current source 74. The output signal So is obtained at the collector of the transistor Q72. The base of the transistor Q72 is connected to ground through the capacitor C. The emitter of the transistor Q72 is connected to ground. In the circuit of FIG. 10, $I_1$ and $I_2$ are selected to have the following unequality (3).

$$I_1 > I_2 \tag{3}$$

where, $I_1$ is an electric current which the current source 73 supplies and $I_2$ is an electric current which the current source 74 supplies.

Figure 11B:
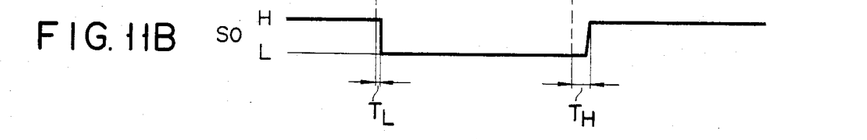

In the circuit of FIG. 10, when the input signal S1 is H level, the capacitor C is changed with the electric current $I_1$ to turn the transistor Q72 on. Thus, the output signal So (FIG. 11B) is set at L level. The delay time $T_L$ is shown as follows.

$$T_L = \frac{C \cdot V_{B2}}{I_1} \tag{4}$$

where, $V_{B2}$ is a voltage drop appearing across the base and emitter of the transistor Q72 when the electric current $I_2$ flows.

When the input signal S1 is changed H level to L level, charge stored in the capacitor C is discharged through the base and emitters of the transistor Q72 to turn the transistor Q72 off. Thus, the output signal So is changed L level to H level. The delay time $T_H$ is shown as follows.

$$T_H = \frac{C \cdot \Delta V}{I_{BQ2}} \quad (5)$$

where,
$\Delta V = V_{B1} - V_{B2}$
$I_{BQ2} = I_2/h_{FEQ2}$
$V_{B1}$ is a voltage drop appearing across the base and emitter of the transistor Q71 when the electric current $I_1$ follows. $I_{BQ72}$ is a base current flowing through the base of the transistor Q72. $h_{FEQ72}$ is a current amplification factor of the transistor Q72.

Assume now that $$I_1 = 10 I_2 \quad (6)$$

and $V_{B2} = 600$ (mV).

In this case, $\Delta V$ is obtained as about 60 (mV) from the following equation (7).

$$V_{BE} = \frac{kt}{q} \ln \frac{I_c}{I_s} \quad (7)$$

Therefore, $$\frac{V_{B2}}{\Delta V} \approx 10 \quad (8)$$

Here, when equations (6), (8) are substituted into equations (4), (5) and compared with each other, the following equations are obtained.

$$T_L = 1 \quad (9)$$

$$T_H = h_{FEQ2} \quad (10)$$

It can be seen that, from the equations (9), (10), $T_H = T_L h_{FEQ2}$.

Figure 12:
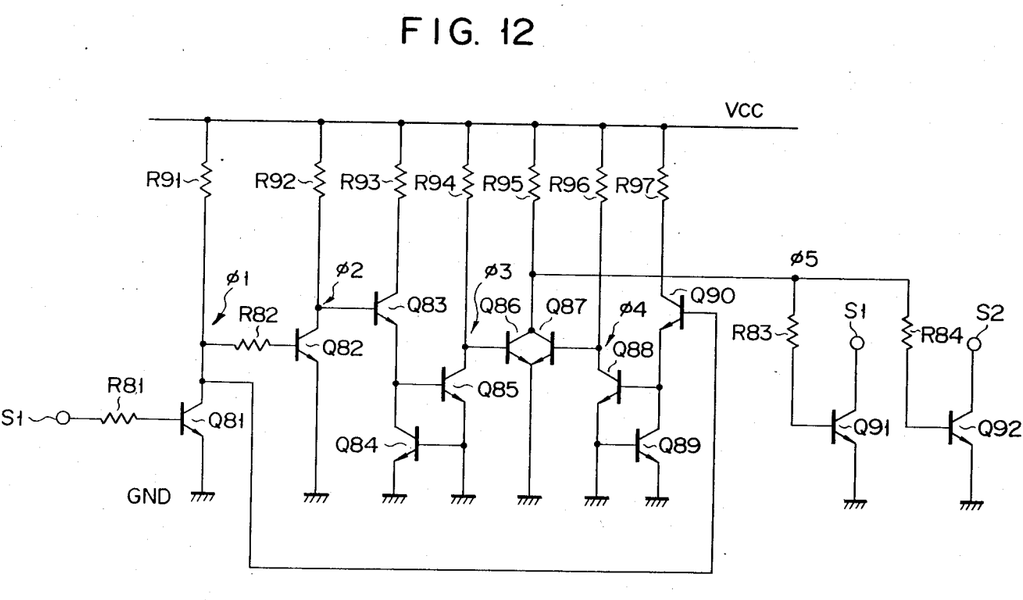
FIG. 12 shows a detailed circuit diagram of the pulse generator constituted by the basic circuit of FIG. 10.

FIG. 12 shows a detailed circuit diagram of the pulse generator constituted based on the basic circuit of FIG. 10. All transistors Q81 to Q92 are of NPN type. Transistors Q86 and Q87 constitutes a differential circuit. The collectors of the transistors Q86 and Q87 are connected to the power source potential $V_{CC}$ through a resistor R95. The emitters of the transistors Q86 and Q87 are connected to ground. Input signal S1 is applied to the gate of the transistor Q81. The collector of the transistor Q81 is connected to the power source potential $V_{CC}$ through a resistor R91. The emitter of the transistor Q81 is connected to ground. The collector of the transistor Q81 is also connected to the gate of the transistor Q82 through a resistor R82. The collector of the transistor Q82 is connected to the power source potential $V_{CC}$ through a resistor R92. The emitter of the transistor Q82 is connected to ground. The collector of the transistor Q82 is also connected to the gate of the transistor Q83. The collector of the transistor Q83 is connected to the power source potential $V_{CC}$ through a resistor R93. The emitter of the transistor Q83 is connected to the collector of the transistor Q84 and the gate of the transistor Q85. The emitter of the transistor Q84 is connected to ground. The collector of the transistor Q85 is connected to the power source potential $V_{CC}$ through a resistor R94. The emitter of the transistor Q85 is connected to the gate of the transistor Q84 and ground. The collector of the transistor Q85 is also connected to the gate of the transistor Q86. The gate of the transistor Q87 is connected to the collector of the transistor Q88. The collector of the transistor Q88 is connected to the power source potential $V_{CC}$ through a resistor R96. The emitter of the transistor Q88 is connected to the gate of the transistor Q89 and ground. The collector of the transistor Q89 is connected to the emitter of the transistor Q90 and the gate of the transistor Q88. The emitter of the transistor Q89 is connected to ground. The collector of the transistor Q90 is connected to the power source potential $V_{CC}$ through a resistor R97. The emitter of the transistor Q89 is connected to the collector of the transistor Q81. The collectors of the transistors Q86 and Q87 are also connected to the gate of the transistor Q91 through a resistor R83. The collectors of the transistors Q86 and Q87 are further connected to the gate of the transistor Q92 through a resistor R84. The emitters of the transistors Q91 and Q92 are connected to ground. Output signals S2 and S3 are obtained at the collector of the transistor Q91 and the collector of the transistor Q92, respectively.

In the FIG. 12 circuit, the capacitance C in the basic circuit of FIG. 10 may be formed by the capacitance Ccs between the collector of the transistor Q84 and substrate and the capacitance Ccs between the collector of the transistor Q89 and substrate, or the capacitance Ccb between the collector and base of the transistor Q84 and the capacitance Ccb between the collector and the base of the transistor Q89.

Figure 13A:
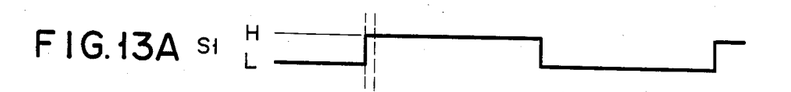
FIGS. 13A to 13G show timing charts of various portions of the pulse generator of FIG. 12.
Figure 13B:
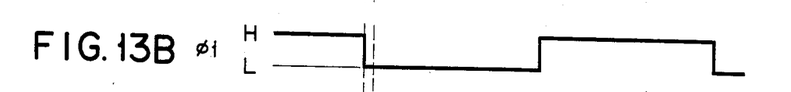
Figure 13C:
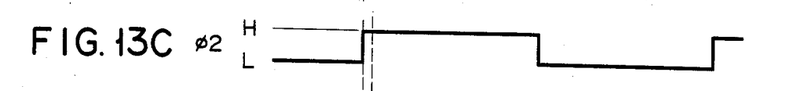
Figure 13D:
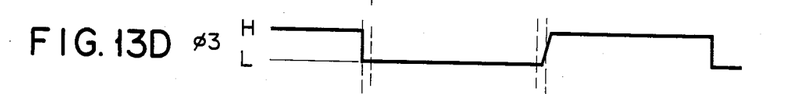
Figure 13E:
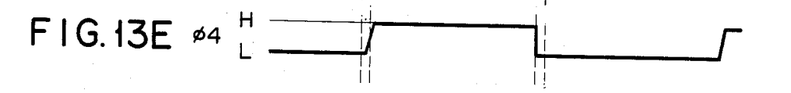
Figure 13F:
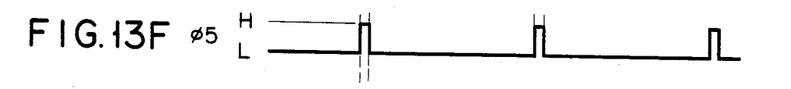
Figure 13G:
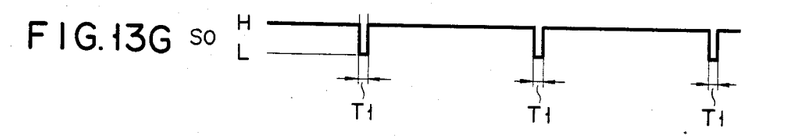

FIGS. 13A to 13G show time charts of signals of various portions of the FIG. 12 circuit. FIGS. 13A and 13B show input and output signals, respectively. FIGS. 12B, 12C, 12D, 12E and 12F show the signals of the collectors of the transistors Q81, Q82, Q85, Q88 and Q86, respectively.

Figure 14:
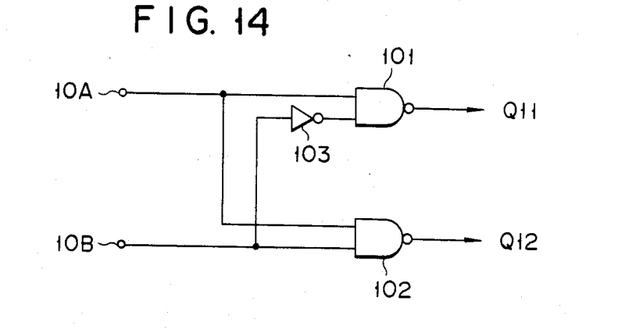
FIG. 14 shows a circuit diagram of the control circuit in the reversing circuit of FIG. 2.

FIG. 14 shows a schematic circuit diagram of the control circuit 11 in the reversing circuit of FIG. 2. The control circuit 11 comprises two NAND gate 101 and 102 and an inverter 103. One input terminal of NAND gate 101 is connected to the input terminal 10A and one input terminal of NAND gate 102 is also connected to the input terminal 10A. The other input terminal of NAND gate 101 is connected to the input terminal 10B through the inverter 103. The other input terminal of NAND gate 102 is directly connected to the input terminal 10B. The output terminal of NAND gate 101 is connected to the collector of the transistor Q11. The output terminal of NAND gate 102 is connected to the collector of the transistor Q12.

As seen from the foregoing description, the present invention is additionally provided with a means for applying a pulse to delay the timing at which transistors Q3 and Q4 are reversed from the on-state to the off-state. The provision of the timing delaying means compensates for the delay of the reverse from the onstate to the off-state of transistors Q1 and Q2, which is due to the carrier storage effect, and therefore, prevents the flow of surge current. As a result, there is eliminated the damage of the transistors and the peripheral circuits by the surge current. This fact implies that the reliability of the current flow reverse circuit is improved, together with the design freedom of the peripheral circuit.

While, in the above-mentioned embodiment, the present invention is applied to the current flow reverse circuit for reversing an electrical current flow to the DC motor, it is of course applicable for various types of load circuits in which the flow direction of the current flowing through the load must be reversed.

What is claimed is:

1. A circuit for reversing the flow of electric current comprising:
    a load driven by current and having first and second terminals to which the current is applied;
    first and second potential sources;
    first and second transistors each having collector-emitter paths respectively connected between the first potential source and said first terminal and between said first potential source and said second terminal;
    third and fourth transistors each having collector-emitter paths respectively connected between said first terminal and said second potential source and between said second terminal and said second potential source;
    said first and fourth transistors forming a first circuit for directing current flow through said load in one direction, and said second and third transistors forming a second circuit for directing current flow through said load in the opposite direction;
    bias means for reversing the biasing state of each of said first circuit and said second circuit, thereby to cause said circuits to operate alternately and reverse the flow of the current flowing through said load; and
    pulse generating means for applying first and second control pulses to, respectively, said third and fourth transistors to delay the turning-on of said third transistor until said first transistor is turned off during operation of said second circuit, and the turning-on of said fourth transistor until said second transistor is turned off during operation of said first circuit.

2. A circuit for reversing the flow of electric current according to claim 1, wherein said bias means comprises a first bias circuit for biasing said first transistor, a second bias circuit for biasing said second transistor, a third bias circuit for biasing said third transistor and a fourth bias circuit for biasing said fourth transistor, the third bias circuit being supplied with said first control pulse and the fourth bias circuit being supplied with said second control pulse.

3. A circuit for reversing the flow of electric current according to claim 1, comprising a control circuit responsive to control input pulses and having outputs connected to said bias means for controlling the bias applied to said first and second circuits, and wherein said pulse generating means comprises a first pulse generating circuit including an inverter for inverting said control input pulse, a first capacitor which is charged or discharged in synchronism with the leading edge and the trailing edge of a pulse outputted from the said inverter and a first voltage comparator for comparing the voltage across said capacitor with a reference voltage, and a second pulse generating circuit including a capacitor which is charged and discharged in synchronism with the leading and trailing edges of said control input pulse and a second voltage comparator for comparing a voltage across said second capacitor with the reference voltage.

4. A circuit for reversing an electric current flow according to claim 3, wherein said first pulse generating circuit further comprises a circuit for logically processing the output signal of said first comparator and the output pulse from said inverter circuit, and said second pulse generating circuit further comprises a circuit for logically processing the output signal from said second comparator and said control input pulse.

5. A circuit for reversing an electric current flow according to claim 3, further comprising a circuit for logically processing the output signal of said first comparator in said first pulse generating circuit, and the output signal of said second comparator of said second pulse generating circuit.

* * * * *